(12) United States Patent
Dorrian et al.

(10) Patent No.: US 7,017,915 B2
(45) Date of Patent: Mar. 28, 2006

(54) STEM OR SHAFT SEAL ARRANGEMENT

(75) Inventors: Philip J. Dorrian, Webster, MA (US); David C. Bayreuther, Griswold, CT (US)

(73) Assignee: Metso Automation USA Inc., Dover, DE (US)

( * ) Notice: Subject to any disclaimer, the term of this patent is extended or adjusted under 35 U.S.C. 154(b) by 0 days.

(21) Appl. No.: 09/968,982

(22) Filed: Oct. 3, 2001

(65) Prior Publication Data

US 2003/0062688 A1    Apr. 3, 2003

(51) Int. Cl.
*F16J 15/26*    (2006.01)

(52) U.S. Cl. .................. 277/529; 277/531; 277/502; 251/214

(58) Field of Classification Search .......... 277/529, 277/531, 532, 502; 251/214; 285/339, 343, 285/314, 321, 341, 421
See application file for complete search history.

(56) References Cited

U.S. PATENT DOCUMENTS

| | | | |
|---|---|---|---|
| 226,558 A | 4/1880 | Shearer | |
| 382,334 A | 5/1888 | Thacher | |
| 530,423 A | 12/1894 | Kay | |
| 672,238 A | 4/1901 | Philp | |
| 808,512 A * | 12/1905 | Cook | 277/531 |
| 1,321,475 A * | 11/1919 | Rebsamen | 277/535 |
| 1,717,114 A * | 6/1929 | McNulty | 277/529 |
| 1,980,720 A | 11/1934 | Field et al. | |
| 2,055,904 A * | 9/1936 | Lindgren | 277/529 |
| 2,126,366 A * | 8/1938 | Boyer | 277/526 |
| 2,204,915 A * | 6/1940 | Sharp | 277/529 |
| 2,745,687 A * | 5/1956 | Stack | 277/529 |
| 3,258,281 A * | 6/1966 | Scott et al. | 285/328 |
| 3,288,222 A * | 11/1966 | Urbanosky | 166/192 |
| 3,294,408 A | 12/1966 | Smith | |
| 3,294,426 A * | 12/1966 | Lyon | 285/334.5 |
| 3,321,947 A * | 5/1967 | Teeters | 72/377 |
| 3,567,843 A * | 3/1971 | Collins et al. | 174/51 |
| 3,722,925 A * | 3/1973 | Robbins | 285/55 |
| 3,787,080 A * | 1/1974 | Daniel | 285/341 |

(Continued)

FOREIGN PATENT DOCUMENTS

DE    266626    4/1989

(Continued)

*Primary Examiner*—Robert J. Sandy
*Assistant Examiner*—Michael J Kyle
(74) *Attorney, Agent, or Firm*—Oblon, Spivak, McClelland, Maier & Neustadt, P.C.

(57) ABSTRACT

An improved seal arrangement in an assembly such as a valve assembly in which a compression member is provided to press a seal between the compression member and the valve body. In a preferred form, the compression member includes a recess which receives a first portion of the seal, and a second portion of the seal is disposed between the compression member and the valve body. In addition, a first inclined surface is provided in the recess of the compression member. The first inclined surface contacts a second inclined surface provided on the first portion of the seal. A third inclined surface on the compression member contacts a fourth inclined surface provided at a juncture between the first and second portions of the seal. Further, a fifth inclined surface is provided on the housing to contact a sixth inclined surface provided on the second portion of the seal. The arrangement creates lateral or side loads between the seal and the valve stem and also between the seal and the valve body to prevent or minimize leakage over a large number of valve operating cycles.

56 Claims, 2 Drawing Sheets

U.S. PATENT DOCUMENTS

| | | | |
|---|---|---|---|
| 3,970,336 A * | 7/1976 | O'Sickey et al. | 285/341 |
| 4,247,121 A * | 1/1981 | Bergman | 277/3 |
| 4,328,974 A | 5/1982 | White et al. | |
| 4,336,944 A | 6/1982 | Blair | |
| 4,745,938 A * | 5/1988 | Nimberger et al. | 137/15.18 |
| 4,898,393 A | 2/1990 | Rollins | |
| 5,083,749 A * | 1/1992 | Linderman et al. | 251/214 |
| 5,326,074 A * | 7/1994 | Spock et al. | 251/214 |
| 5,364,111 A | 11/1994 | Wunsch | |
| 5,392,992 A * | 2/1995 | Farnsteiner et al. | 239/296 |
| 5,503,406 A | 4/1996 | Armstrong et al. | |
| 5,513,556 A * | 5/1996 | Schaefer | 92/168 |
| 5,538,256 A | 7/1996 | Rinne | |
| 5,979,491 A * | 11/1999 | Gonsior | 137/375 |
| 6,129,336 A * | 10/2000 | Sandling et al. | 251/214 |
| 6,155,575 A | 12/2000 | Hawkins et al. | |

FOREIGN PATENT DOCUMENTS

| | | |
|---|---|---|
| EP | 550941 A1 * | 7/1993 |
| FR | 824083 | 2/1938 |
| GB | 000456 | 0/1852 |
| GB | 015500 | 0/1885 |
| GB | 2150236 | 6/1985 |

\* cited by examiner

STEM OR SHAFT SEAL ARRANGEMENT

FIELD OF THE INVENTION

The invention relates to a stem or shaft seal arrangement. The arrangement is particularly advantageous as a seal arrangement which provides improved leak resistance between a stem seal and the stem or shaft of a valve and between the stem seal and the valve body.

BACKGROUND OF THE INVENTION

Discussion of the Background

Various types of valves include a valve stem (also referred to as a valve shaft) which is utilized for moving a valve closure member between opened and closed positions, as well as to variable control positions between the opened and closed positions. Typically, the valve closure member is disposed inside of a housing known as a valve body. The stem is coupled to the closure member and extends through the valve body so that the stem can be moved at a location exterior to the valve body to move the valve closure to the position desired. In order to prevent leakage of fluids, a seal is typically provided about the valve stem, and the seal is compressed by a compression member or compression plate. In the past, the seal has been in the form of an O-ring type seal having a square or rectangular cross-section. This arrangement is sometimes unreliable or less than optimal, particularly from a standpoint of degrading over a number of operating cycles of the valve. Accordingly, over time, fluid will tend to leak either between the seal and the valve stem, or between the seal and the valve body. Accordingly, an improved stem seal arrangement is desired which provides an improved seal about the stem of a valve to prevent or reduce leakage from the valve body along the valve stem or between the valve body and the seal, with the arrangement capable of withstanding a large number of valve operating cycles.

SUMMARY OF THE INVENTION

The above as well as additional objectives are achieved in accordance with the present invention which provides a valve assembly having an improved stem seal arrangement. In a particularly preferred form, the compression plate is provided with a recess, and the seal has an extended portion which extends up into the recess of the compression plate. In addition, a series of inclined surfaces are provided such that when the compression plate is urged toward the valve body to exert pressure upon the seal, side loads or lateral forces are also exerted which urge the seal toward the valve stem. In addition, the inclined surfaces provide side loads or lateral forces between the seal and the valve housing. This arrangement ensures an advantageous seal between the valve stem and the seal, and between the valve body and the seal, over a large number of operating cycles. For example, even if the seal should wear over time, sealing contact is nevertheless maintained because the seal is urged toward the valve stem. Although the arrangement is particularly advantageous in providing a seal about a valve stem or valve shaft, the seal arrangement could also be advantageously utilized wherever a stem or shaft passes through a pressurized boundary such that it is desirable to provide a seal about the shaft to prevent leakage. For example, the seal arrangement could also be utilized to provide a seal about a rotary pump or compressor shaft.

BRIEF DESCRIPTION OF THE DRAWINGS

A more complete understanding of the invention and many of the attendant advantages thereof will become apparent from the following detailed description, particularly when considered in conjunction with the accompanying drawings in which.

DETAILED DESCRIPTION OF THE PREFERRED EMBODIMENTS

Figure 1:
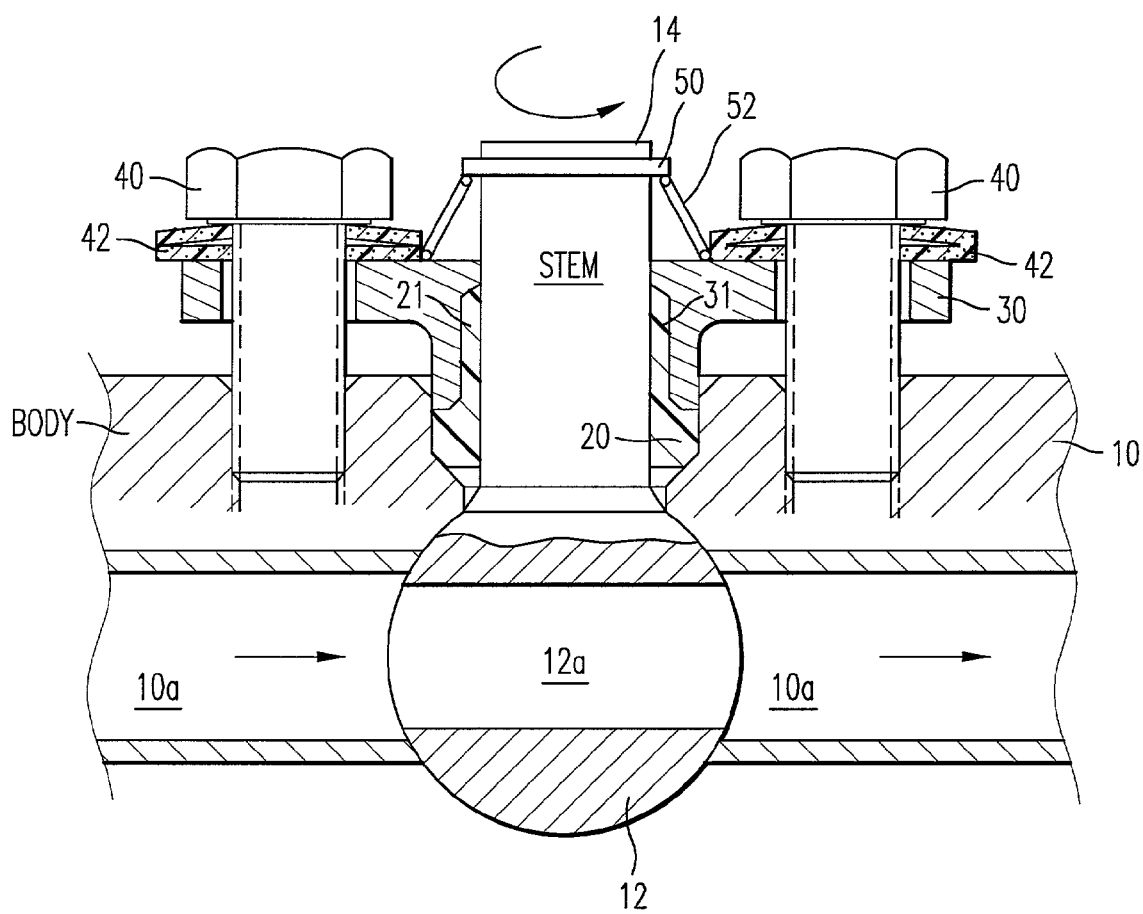
FIG. 1 is a schematic cross-sectional view of a valve assembly according to the invention.

Referring to FIG. 1, an example of a valve assembly having a seal arrangement according to the invention is illustrated. The valve assembly includes a housing or valve body 10, a closure member 12, and a valve stem or valve shaft 14 coupled to the closure member 12 for moving the closure member. In the illustrated example, the closure member 12 is a ball closure member, and the valve assembly is a rotary valve, such that the closure member 12 is moved between opened and closed positions by rotating the stem 14. The angular position of the closure member determines the degree of alignment of the passage 12a through the closure with the flow passage 10a through the valve body, thereby determining the amount the valve is opened or closed.

Although a rotary valve assembly having a ball closure is depicted in FIG. 1, it is to be understood that the invention can be utilized in a wide variety of valves. Such valves can include on-off valves, in which the valve is operated in either the fully closed or the fully opened position, or variable control valves, in which the valve is operated at various degrees of open positions to vary a given flow or flow rate. Also, the invention can be applied to various types of rotary valves, including ball valves, segmented ball valves, butterfly valves, etc. In addition, the invention can be applied to linear valves in which, in lieu of positioning the closure member by rotating the valve stem, the stem is moved linearly as in, for example, a globe valve. Also, the invention can be utilized for various types of fluids, including liquids, gases, slurries, etc. It is also to be understood that the seal arrangement can be used in assemblies other than valve assemblies where it is desired to provide a seal about a shaft which passes through a pressure boundary. For example, the seal arrangement can be provided about a shaft which extends from an interior of a housing which is under pressure or vacuum to the exterior of the housing, to prevent or minimize leakage along the shaft. By way of example, the seal arrangement could be used as a seal about a pump or compressor shaft.

Although not shown in the drawing, often an actuator is utilized for moving the stem 14 to position the valve closure 12. Various types of actuators are available, including pneumatic, electrical (motor) or electro-mechanical, and the invention could also be applied to valve assemblies in which the stem is moved manually, for example, utilizing a positioning wheel or lever.

As shown in FIG. 1, the advantageous seal arrangement of the invention includes a seal 20 and a compression member 30, each of which extends about the stem 14. As discussed earlier, in prior arrangements, the seal has been provided in the form of an O-ring seal having a square or rectangular cross-section. However, such a seal arrangement often degrades after an undesirably small number of operating cycles, and thus requires regular replacement/maintenance in order to avoid or minimize leakage. Obviously such an arrangement is problematic not only from a standpoint of maintenance costs, but also in the downtime of the system within which the valve is disposed. The arrangement of the invention has extended the operating life of the seal assembly up to eight times that of prior seal arrangements.

In the arrangement shown in FIG. 1, a series of bolts or screws 40 are provided for urging the compression member 30 toward the housing 10 in order to press the seal 20 between the compression member 30 and the valve body 10. Often washers or Belville springs 42 are also provided as shown in FIG. 1. Although bolts 40 are depicted for urging the compression member 30 toward the valve body 10, it is to be understood that various other expedients could be utilized for urging the compression member 30 towards the housing 10 including, for example, a spring loaded arrangement, a clamp arrangement, or any other suitable assemblage for applying a force to the compression member 30 to press the seal 20 between the compression member 30 and the valve body 10.

Elements 50, 52 are, respectively, a plate and a spring which can optionally be provided to dissipate charges, such as static charges. These elements can be utilized where such charges are dangerous, for example, where flammable fluids are present.

As shown in FIG. 1, in accordance with one of the advantageous aspects of the invention, the compression member 30 is provided with an elongated recess 31, and the seal 20 includes an extended portion 21 which extends up into the recess. This arrangement provides an advantageous seal arrangement in which the portion of the stem over which the seal extends is increased. In addition, by virtue of additional features provided by the arrangement of the invention discussed below, the seal is urged toward the stem when the compression member 42 is urged toward the valve body 10 to ensure that the sealing relationship between the stem and the seal is maintained over a large number of operating cycles. In particular, even if the seal 20 should wear over time or over a large number of operating cycles, because the seal is urged toward the stem 14, a reliable sealing relationship about the stem is maintained to thereby prevent (or at least minimize) leakage of fluids from the or valve body 10 along the stem 14. In addition, lateral or side loads are provided between the housing or valve body 10 and the seal 20 to not only provide lateral or side loads between the stem and the seal, but also to provide lateral or side loads between the valve body 10 and the seal 20, to thereby also prevent leakage between the seal 20 and the valve body 10. Although the various parts can be formed of various materials, the compression member 30 will typically be formed of metal, and the seal 20 will typically be formed of a plastic, elastic, or elastomeric material, for example, Teflon (polytetrafluoroethylene). However, it is to be understood that the various parts can be formed of various materials as would be understood by those skilled in the art. In particular, the seal and other parts can be formed of a wide variety of materials, including metals, plastics or rubber materials, with appropriate tolerances and surface finishes provided so that a good seal is achieved when the assembly is loaded (i.e., when the compression member is urged toward the housing). Presently a plastic material such as Teflon (polytetrafluoroethylene) is preferred.

Figure 2A:
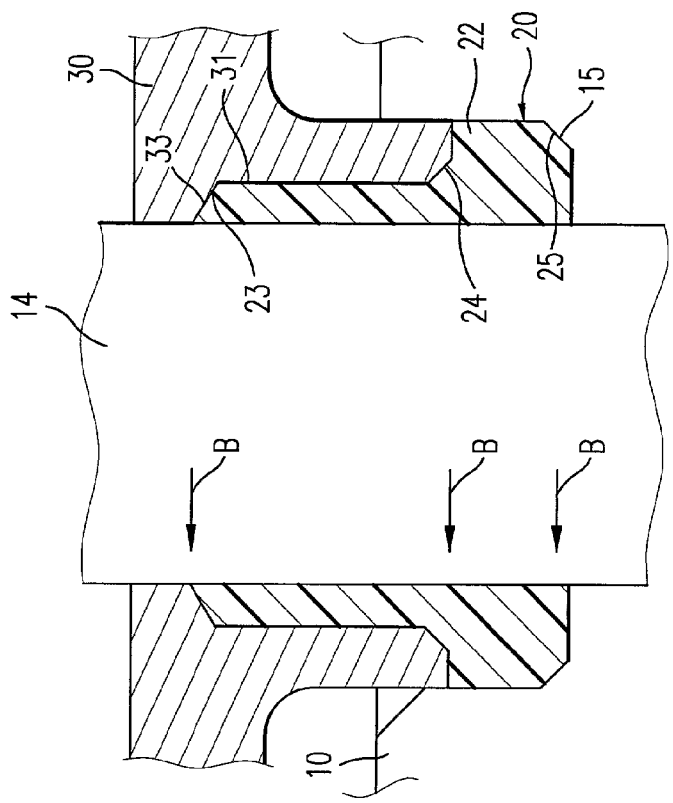
FIGS. 2A and 2B depict the improved seal arrangement and the side loads which are advantageously provided according to a preferred form of the invention to ensure an advantageous seal arrangement between the valve stem, the seal, and the valve body.
Figure 2B:
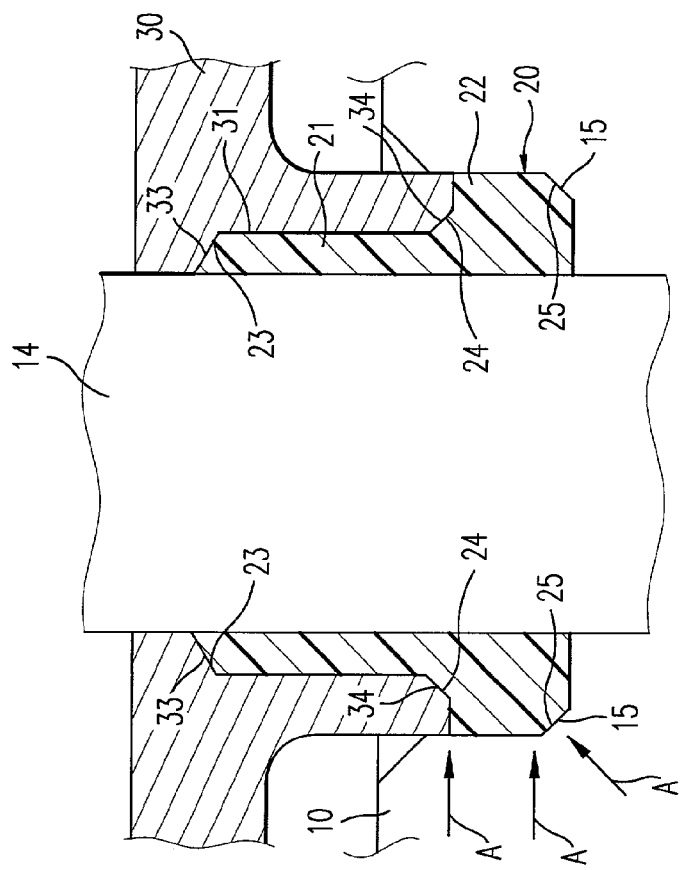

Referring to FIGS. 2A and 2B, an enlarged view of the seal assembly is depicted, with side or lateral loads between the seal and the housing depicted by arrows A in FIG. 2A, and with side loads or lateral forces between the seal and the stem depicted by arrows B in FIG. 2B. As can be seen, in a presently preferred form, the seal 20 has an L-shaped cross-section, such that the seal includes a first portion 21 which extends into the recess 31 of the compression member 30. The seal further includes a second portion 22 which is disposed between the compression member 30 and the valve body or housing 10. Although the seal 20 in the presently preferred embodiment is L-shaped (in cross-section), it is to be understood that various other shapes are also possible.

Still referring to FIGS. 2A and 2B, in a particularly preferred form, the seal arrangement includes various mating inclined surfaces to provide the improved side loads or lateral forces when the compression member 30 is urged toward the valve body or housing 10. In the illustrated embodiment, three pairs of inclined surfaces are provided which contact each other to provide the lateral forces or side loads. In particular, a first inclined surface 33 is disposed at the top of the recess 31, and the first inclined surface 33 contacts a second inclined surface 23 provided at the top of the first portion 21 of the seal member 20. As a result, when the compression member is urged toward the housing, the seal 22 is urged toward the stem such that a lateral or side load is provided between the seal and the stem 14 as represented by the top arrow B in FIG. 2B. A third inclined surface 34 is provided at a bottom or at an inlet portion of the recess 31 of the compression member 30, and this inclined surface 34 contacts a fourth inclined surface 24 provided at a juncture of the first and second portions 21, 22 of the seal 20. These inclined surfaces also provide a lateral force or a side load to urge the seal toward the stem as represented by the middle arrow B in FIG. 2B. The "top" and "bottom" portions of the recess 31 respectively correspond to the deepest and inlet parts of the recess 31. Depending upon the mounting orientation of the valve assembly, the top of the recess might not actually be above the bottom of the recess as would be understood by those skilled in the art.

A fifth inclined surface 15 is provided on the housing 10, and this inclined surface contacts a sixth inclined surface 25 provided on the second portion 22 of the seal 20. These inclined surfaces also urge the seal toward the stem when the compression member is urged toward the housing or valve body 10 as represented by the lowermost arrow B in FIG. 2B. The various inclined surfaces also result in lateral forces between the seal 20 and the housing 10 as represented by the three arrows A in FIG. 2, thereby also ensuring an advantageous sealing relationship between the housing 10 and the seal 20 to prevent leakage between the seal 20 and the housing 10.

As should be apparent from the foregoing, the arrangement of the present invention advantageously provides lateral side loads and the side loads are provided over an extended seal length or at least at plural points along the seal as compared with prior arrangements. With the arrangement of the invention, a good seal has been obtained over a cycle life Up to eight times that of conventional arrangements.

Although the various inclined surfaces are shown in contact in FIGS. 2A and 2B, it is to be understood that the surfaces might not be in contact until the urging force or urging pressure is applied in order to urge the compression member 30 toward the housing 10. For example, when the various components are assembled, small spaces might be present between the inclined surfaces of the compression member and the seal 20, but when the compression member 30 is urged toward the valve body, the surfaces contact each other in order to provide the lateral or side loads. Also, although the presently preferred embodiment includes three pairs of inclined surfaces, a greater or lesser number of inclined surfaces could be provided. Even if no inclined surfaces are provided, the present arrangement is advantageous by virtue of the extended portion of the seal which is received by the recess of the compression member. Also, the inclined surfaces need not be provided on both of the contacting surfaces. For example, the surface 23 of the seal member could be substantially horizontal and a side load would nevertheless be imparted due to the inclined surface 33 provided on the compression member. Similarly, the seal could have an inclined surface, but with the surface 33 in the recess substantially horizontal. The same is also true with respect to the other mating pairs of inclined surfaces. However, the illustrated embodiment is presently preferred to provide advantageous side loads utilizing three pairs of inclined surfaces, such that lateral or side loads are provided at at least three locations at which the seal contacts the stem and to also preferably provide at least three locations at which side loads are present between the seal and the valve housing 10. It is to be understood that the term "contact" is utilized broadly herein because the contacting surfaces need not directly contact one another. For example, sometimes surfaces are coated, or a tape, such as a Teflon tape, is applied to various surfaces to enhance leak prevention or improve the wear capabilities of the various components. Accordingly, a material or part could be interposed between inclined surfaces, for example, the surface 33 and the surface 23. However, the surfaces are nevertheless considered in contact with one another in the sense of the present invention because the loading of the compression member causes the surface 33 to be urged against the surface 23 and thereby provide a lateral or side load between the seal 20 and the stem 14.

Obviously, numerous modifications and variations of the present invention are possible in light of the above teachings. It is therefore to be understood that, within the scope of the appended claims, the invention may be practiced otherwise and as specifically described herein.

The invention claimed is:

1. A valve assembly comprising:
    a valve body configured to support a valve closure member;
    a stem extending from said valve body, said stem coupled to said valve closure member for moving said valve closure member;
    a compression member which extends about said stem, said compression member having a recess, said recess including an inner surface facing toward said stem;
    a monolithic seal which extends about said stem and which contacts said compression member and said valve body, wherein said seal includes a first portion disposed in said recess and a second portion disposed between said compression member and said valve body, and wherein said first portion is disposed between said stem and said inner surface of said recess; and
    means for urging said compression member toward said valve body such that said seal is pressed between said compression member and said valve body, wherein,
    said compression member includes a first inclined surface disposed in said recess,
    said first portion of said seal includes a second inclined surface which contacts said first inclined surface when said compression member is urged toward said valve body to urge said first portion of said seal toward said stem,
    said compression member includes a third inclined surface and said seal includes a fourth inclined surface, and
    said third inclined surface contacts said fourth inclined surface to urge said seal toward said stem when said compression member is urged toward said valve body.

2. A valve assembly as recited in claim 1, wherein said valve body includes a fifth inclined surface and said seal includes a sixth inclined surface, and wherein said fifth inclined surface contacts said sixth inclined surface to urge said seal toward said stem when said compression member is urged toward said valve body.

3. A valve assembly as recited in claim 2, wherein said fourth inclined surface is disposed at a juncture of said first portion and said second portion of said seal, and wherein said sixth inclined surface is disposed on said second portion of said seal.

4. A valve assembly as recited in claim 3, wherein said seal has an L-shaped cross-section.

5. A valve assembly as recited in claim 1, wherein said seal has an L-shaped cross-section.

6. A valve assembly comprising:
    a valve body configured to support a valve closure member;
    a stem extending from said valve body, said stem coupled to said valve closure member for moving said closure member;
    a compression member which extends about said stem;
    a monolithic seal which extends about said stem, and wherein at least a portion of said seal is disposed between said compression member and said valve body; and
    means for urging said compression member toward said valve body such that said seal is pressed between said compression member and said valve body, wherein:
    said seal includes an inclined surface, and said valve body includes an inclined surface which faces toward said stem,
    said inclined surface of said seal contacts said inclined surface of said valve body when said compression member is urged toward said valve body such that said seal is urged toward said stem,
    said inclined surface of said seal is disposed between said valve body and said stem,
    said compression member includes an inclined surface which contacts a further inclined surface provided on said seal to further urge said seal toward said stem when said compression member is urged toward said valve body,
    said inclined surface of said compression member faces said stem, and said further inclined surface of said seal is disposed between said inclined surface of said compression member and said stem,
    said compression member includes a third inclined surface and said seal includes a fourth inclined surface, and
    said third inclined surface contacts said fourth inclined surface to urge said seal toward said stem when said compression member is urged toward said valve body.

7. A valve assembly as recited in claim 6, wherein said seal has an L-shaped cross-section.

8. A valve assembly comprising:
    a valve body configured to support a valve closure member;

a stem extending from said valve body, said stem coupled to said valve closure member for moving said closure member;
a compression member which extends about said stem;
a monolithic seal which extends about said stem, and wherein at least a portion of said seal is disposed between said compression member and said valve body; and
means for urging said compression member toward said valve body such that said seal is pressed between said compression member and said valve body, wherein:
said seal includes an inclined surface, and said valve body includes an inclined surface,
said inclined surface of said seal contacts said inclined surface of said valve body when said compression member is urged toward said valve body such that said seal is urged toward said stem,
said compression member has a recess, said recess including an inner surface which faces toward said stem,
said seal includes a first portion disposed in said recess and a second portion disposed between said compression member and said valve body, and
said first portion is disposed between said inner surface and said stem, wherein,
said compression member includes at least one inclined surface disposed in said recess which urges said first portion of said seal toward said stem when said compression member is urged toward said valve body,
said seal includes three inclined surfaces, and
two of said three inclined surfaces contact said compression member and a third of said three inclined surfaces contacts said valve body when said compression member is urged toward said valve body such that said seal is urged toward said stem.

9. A valve assembly as recited in claim 8, wherein said seal has an L-shaped cross-section.

10. A valve assembly as recited in claim 8, wherein one of said three inclined surfaces is disposed on said first portion of said seal, another of said three inclined surfaces is disposed at a juncture between said first portion and second portion, and a third of said three inclined surfaces is disposed on said second portion of said seal.

11. A valve assembly comprising:
a valve body configured to support a valve closure member;
a stem extending from said valve body, said stem coupled to said valve closure member for moving said closure member;
a compression member which extends about said stem;
a monolithic seal which extends about said stem, and wherein at least a portion of said seal is disposed between said compression member and said valve body; and
means for urging said compression member toward said valve body such that said seal is pressed between said compression member and said valve body, wherein,
said seal includes an inclined surface, and said valve body includes an inclined surface,
said inclined surface of said seal contacts said inclined surface of said valve body when said compression member is urged toward said valve body such that said seal is urged toward said stem,
said compression member has a recess, said recess including an inner surface which faces toward said stem,
said seal includes a first portion disposed in said recess and a second portion disposed between said compression member and said valve body,
said first portion is disposed between said inner surface and said stem,
said compression member includes a pair of inclined surfaces, and
one of said pair of inclined surfaces is disposed at a top of said recess and another of said pair of recesses is disposed at a bottom of said recess.

12. A valve assembly comprising:
a valve body configured to support a valve closure member;
a stem extending through said valve body, said stem coupled to said valve closure member for moving said valve closure member;
a compression member which extends about said stem, said compression member including a recess and a pair of inclined surfaces, wherein at least one of said inclined surfaces is disposed in said recess, and wherein said recess includes an inner surface which faces toward said stem;
a monolithic seal contacting said valve body and which extends about said stem and which includes a first portion disposed in said recess and a second portion disposed between said compression member and said valve body, and wherein said first portion is disposed between said stem and said inner surface of said recess; and
means for urging said compression member toward said valve body such that said seal is pressed between said compression member and said valve body, wherein:
said pair of inclined surfaces of said compression member contacts said seal to urge said seal toward said stem when said compression member is urged toward said valve body, and
each inclined surface of said pair of inclined surfaces is obliquely arranged with respect to a longitudinal axis of said stem.

13. A valve assembly as recited in claim 12, wherein said seal includes a pair of inclined surfaces which respectively contact said pair of inclined surfaces on said compression member.

14. A valve assembly as recited in claim 12, wherein said valve body includes an inclined surface which contacts said seal to urge said seal toward said stem when said compression member is urged toward said valve body.

15. An assembly which provides an improved seal arrangement to reduce leakage between a housing and an exterior of the housing in which the interior and exterior of the housing are at different pressures, the assembly comprising:
a housing having an interior at a first pressure;
a shaft extending from a location inside of said housing, through said housing and to a location exterior to said housing, and wherein said location exterior to said housing is at a second pressure that is different from said first pressure;
a compression member which extends about said shaft at said location exterior to said housing, said compression member including a recess and a pair of inclined surfaces, wherein at least one of said inclined surfaces is disposed in said recess, and wherein said recess includes an inner surface which faces toward said shaft;
a monolithic seal contacting said housing and which extends about said shaft at said location exterior to said housing and which includes a first portion disposed in said recess and a second portion disposed between said compression member and said housing, and wherein said first portion is disposed between said shaft and said inner surface of said recess; and means for urging said compression member toward said housing such that said seal is pressed between said compression member and said housing, wherein:

said pair of inclined surfaces of said compression member contacts said seal to urge said seal toward said shaft when said compression member is urged toward said housing, and each inclined surface of said pair of inclined surfaces is obliquely arranged with respect to a longitudinal axis of said shaft.

16. An assembly as recited in claim 15, wherein said seal includes a pair of inclined surfaces which respectively contact said pair of inclined surfaces on said compression member.

17. An assembly as recited in claim 15, wherein said housing includes an inclined surface which contacts said seal to urge said seal toward said shaft when said compression member is urged toward said housing.

18. A valve assembly as recited in claim 1, wherein said seal includes an L-shaped cross-section, and wherein a base of said L-shaped cross-section extends in a radially outward direction from said stem, and further wherein an upright portion of said L-shaped cross-section includes an inner surface which extends along said stem.

19. A valve assembly as recited in claim 1, wherein said second portion of said seal is also disposed between said valve body and said stem.

20. A valve assembly as recited in claim 6, wherein said seal includes an L-shaped cross-section, and wherein a base of said L-shaped cross-section extends in a radially outward direction from said stem, and further wherein an upright portion of said L-shaped cross-section includes an inner surface which extends along said stem.

21. A valve assembly as recited in claim 8, wherein said seal includes an L- shaped cross-section, and wherein a base of said L-shaped cross-section extends in a radially outward direction from said stem, and further wherein an upright portion of said L-shaped cross-section includes an inner surface which extends along said stem.

22. A valve assembly as recited in claim 8, wherein said second portion of said seal is also disposed between said valve body and said stem.

23. A valve assembly as recited in claim 12, wherein said seal includes an L-shaped cross-section, and wherein a base of said L-shaped cross-section extends in a radially outward direction from said stem, and further wherein an upright portion of said L-shaped cross-section includes an inner surface which extends along said stem.

24. A valve assembly as recited in claim 12, wherein said second portion of said seal is also disposed between said valve body and said stem.

25. A valve assembly as recited in claim 15, wherein said seal includes an L- shaped cross-section, and wherein a base of said L-shaped cross-section extends in a radially outward direction from said shaft, and further wherein an upright portion of said L-shaped cross-section includes an inner surface which extends along said shaft.

26. A valve assembly as recited in claim 15, wherein said second portion of said seal is also disposed between said housing and said shaft.

27. A valve assembly as recited in claim 1, wherein said seal is formed of at least one of a plastic material, an elastic material, and an elastomeric material.

28. A valve assembly as recited in claim 1, wherein said seal comprises polytetrafluoroethylene.

29. A valve assembly as recited in claim 1, wherein said seal comprises a plastic material.

30. A valve assembly as recited in claim 6, wherein said seal is formed of at least one of a plastic material, an elastic material, and an elastomeric material.

31. A valve assembly as recited in claim 6, wherein said seal comprises polytetrafluoroethylene.

32. A valve assembly as recited in claim 6, wherein said seal comprises a plastic material.

33. A valve assembly as recited in claim 6, wherein said seal includes a first portion and a second portion, and wherein each of said first portion and said second portion of said seal includes parallel faces extending parallel to said stem, and wherein said further inclined surface of said seal is disposed at a juncture between said first portion and said second portion.

34. A valve assembly as recited in claim 6, wherein at a first location said seal, said compression member and said valve housing overlap with respect to a radial direction of said stem, and wherein at said first location said compression member is disposed radially outside of said seal and said valve body is disposed radially outside of said compression member.

35. A valve assembly as recited in claim 34, wherein at a second location said valve body overlaps said seal with respect to a radial direction of said stem and said valve body is disposed radially outside of said seal, and wherein said compression member is not present at said second location.

36. A valve assembly as recited in claim 33, wherein said valve body includes a recess which receives a portion of said compression member, and wherein said second portion of said seal is disposed in said recess of said valve body.

37. A valve assembly as recited in claim 6, wherein said valve body includes a recess which receives a portion of said compression member, and wherein a portion of said seal is disposed in said recess of said valve body.

38. A valve assembly as recited in claim 8, wherein said seal is formed of at least one of a plastic material, an elastic material, and an elastomeric material.

39. A valve assembly as recited in claim 8, wherein said seal comprises polytetrafluoroethylene.

40. A valve assembly as recited in claim 8, wherein said seal comprises a plastic material.

41. A valve assembly as recited in claim 12, wherein said seal is formed of at least one of a plastic material, an elastic material, and an elastomeric material.

42. A valve assembly as recited in claim 12, wherein said seal comprises polytetrafluoroethylene.

43. A valve assembly as recited in claim 12, wherein said seal comprises a plastic material.

44. A valve assembly as recited in claim 12, wherein each of said first portion and said second portion of said seal includes parallel faces extending parallel to said stem, and wherein said seal further includes an inclined surface at a juncture between said first portion and said second portion.

45. A valve assembly as recited in claim 12, wherein at a first location said seal, said compression member and said valve body overlap with respect to a radial direction of said stem, and wherein at said first location said compression member is disposed radially outside of said seal and said valve body is disposed radially outside of said compression member.

46. A valve assembly as recited in claim 45, wherein at a second location said valve body overlaps said seal with respect to a radial direction of said stem and said valve body is disposed radially outside of said seal, and wherein said compression member is not present at said second location.

47. A valve assembly as recited in claim 12, wherein said valve body includes a recess which receives a portion of said compression member, and wherein said second portion of said seal is disposed in said recess of said valve body.

48. A valve assembly as recited in claim 47, wherein said recess of said valve body includes an inclined surface which mates with an inclined surface on said seal.

49. An assembly as recited in claim 15, wherein said seal is formed of at least one of a plastic material, an elastic material, and an elastomeric material.

50. An assembly as recited in claim 15, wherein said seal comprises polytetrafluoroethylene.

51. An assembly as recited in claim 15, wherein said seal comprises a plastic material.

52. An assembly as recited in claim 15, wherein each of said first portion and said second portion of said seal includes parallel faces extending parallel to said shaft, and wherein said seal further includes an inclined surface at a juncture between said first portion and said second portion.

53. An assembly as recited in claim 15, wherein at a first location said seal, said compression member and said housing overlap with respect to a radial direction of said shaft, and wherein at said first location said compression member is disposed radially outside of said seal and said housing is disposed radially outside of said compression member.

54. An assembly as recited in claim 53, wherein at a second location said housing overlaps said seal with respect to a radial direction of said shaft and said housing is disposed radially outside of said seal, and wherein said compression member is not present at said second location.

55. An assembly as recited in claim 15, wherein said housing includes a recess which receives a portion of said compression member, and wherein said second portion of said seal is disposed in said recess of said housing.

56. An assembly as recited in claim 55, wherein said recess of said housing includes an inclined surface which mates with an inclined surface on said seal.

* * * * *